United States Patent
Huang (10) Patent No.: US 9,766,719 B2
(45) Date of Patent: Sep. 19, 2017

(54) DISPLAY CONTROL METHOD FOR GENERATING VIRTUAL KEYS TO SUPPLEMENT PHYSICAL KEYS

(75) Inventor: Xiuzhang Huang, Guangdong (CN)

(73) Assignee: MEIZU TECHNOLOGY CO., LTD., Guangdong (CN)

(*) Notice: Subject to any disclaimer, the term of this patent is extended or adjusted under 35 U.S.C. 154(b) by 273 days.

(21) Appl. No.: 14/410,742

(22) PCT Filed: Jun. 28, 2012

(86) PCT No.: PCT/CN2012/077716
§ 371 (c)(1),
(2), (4) Date: May 20, 2015

(87) PCT Pub. No.: WO2014/000211
PCT Pub. Date: Jan. 3, 2014

(65) Prior Publication Data
US 2015/0261319 A1    Sep. 17, 2015

(51) Int. Cl.
*G06F 3/0346* (2013.01)
*G06F 3/0488* (2013.01)
(Continued)

(52) U.S. Cl.
CPC .......... *G06F 3/0346* (2013.01); *G06F 3/0416* (2013.01); *G06F 3/0481* (2013.01); *G06F 3/0488* (2013.01); *G06F 3/04817* (2013.01); *G06F 3/04847* (2013.01); *G06K 9/00221* (2013.01); *G09G 3/2092* (2013.01); *G09G 5/38* (2013.01); *G06F 2200/1614* (2013.01);
(Continued)

(58) Field of Classification Search
None
See application file for complete search history.

(56) References Cited

U.S. PATENT DOCUMENTS

| 8,217,904 B2 | 7/2012 | Kim |
| 2008/0119237 A1 | 5/2008 | Kim |

(Continued)

FOREIGN PATENT DOCUMENTS

| CN | 101183292 A | 5/2008 |
| CN | 100552610 C | 10/2009 |

(Continued)

OTHER PUBLICATIONS

International Search Report dated Nov. 12, 2015.
(Continued)

*Primary Examiner* — Maurice L McDowell, Jr.
(74) *Attorney, Agent, or Firm* — Polsinelli PC (57) ABSTRACT

The present invention discloses a display control method and a user equipment. The display control method includes: detecting, by a user equipment, a current screen direction in real time; and placing a system visual key in currently displayed title bar of the user equipment when the user equipment determining an occurrence of a change of the current screen direction. In addition, a user equipment is provided and includes a detection unit configured to detect a current screen direction in real time; and a setting unit configured to place a system visual key in currently displayed title bar of the user equipment when the detection unit determining an occurrence of a change of the current screen direction.

12 Claims, 5 Drawing Sheets

(51) Int. Cl.
  *G06F 3/041* (2006.01)
  *G06F 3/0481* (2013.01)
  *G06F 3/0484* (2013.01)
  *G06K 9/00* (2006.01)
  *G09G 3/20* (2006.01)
  *G09G 5/38* (2006.01)
  *H04M 1/725* (2006.01)

(52) U.S. Cl.
  CPC . *G06F 2200/1637* (2013.01); *G09G 2320/08* (2013.01); *G09G 2340/0492* (2013.01); *H04M 1/7258* (2013.01)

(56) References Cited

U.S. PATENT DOCUMENTS

| | | | | |
|---|---|---|---|---|
| 2008/0181502 | A1* | 7/2008 | Yang | G06F 1/1626 382/181 |
| 2008/0288878 | A1* | 11/2008 | Hayashi | H04M 1/274525 715/762 |
| 2010/0022275 | A1 | 1/2010 | Shu | |
| 2011/0102357 | A1 | 5/2011 | Kajitani | |
| 2011/0148929 | A1* | 6/2011 | Li | G06F 3/03547 345/650 |
| 2012/0242684 | A1 | 9/2012 | Kim | |
| 2013/0093682 | A1* | 4/2013 | Lindsay | G06F 3/04886 345/169 |

FOREIGN PATENT DOCUMENTS

| | | |
|---|---|---|
| CN | 101635764 A | 1/2010 |
| CN | 102231095 A | 11/2011 |
| EP | 1923778 A2 | 5/2008 |
| JP | 20122068815 A | 4/2012 |
| JP | 2012118582 A | 6/2012 |
| KR | 20080044554 A | 5/2008 |

OTHER PUBLICATIONS

Chinese Office Action dated Jul. 2, 2015 in Chinese Patent Application No. 201280072644.0 (9 pages).
International Search Report dated Mar. 14, 2013.

* cited by examiner

DISPLAY CONTROL METHOD FOR GENERATING VIRTUAL KEYS TO SUPPLEMENT PHYSICAL KEYS

CROSS-REFERENCE TO RELATED APPLICATIONS

This application is a National Phase filing under 35 U.S.C. §371 of PCT/CN2012/077716 filed on Jun. 28, 2012, the entire contents of which is hereby incorporated by reference.

FIELD OF THE INVENTION

The present invention relates to a field of data processing, and more particularly, relates to a display control method and a user equipment.

BACKGROUND OF THE INVENTION

As the development of UE (User Equipment) technology, UE provides more and more functions, for example, the currently mobile phone generally possesses an accelerometer function.

When user places the mobile phone in a landscape displaying manner to use, the Apps (Applications) shown on the mobile phone can switch to a landscape displaying manner accordingly. When user places the mobile phone in a portrait displaying manner to use, the Apps shown on the mobile phone can switch to a portrait displaying manner accordingly, thereby greatly facilitating users' usage.

In addition to that, in order to facilitate users' control, the mobile phone is generally setup with system keys. For example, the mobile phone with Android OS is generally setup with three keys, such as "MENU", "BACK" and "HOME". Setting forms of these keys implemented in different mobile phone are different, and generally fall into several types such as "All physical keys", "An virtual keys" and "Combination of physical and virtual keys".

Figure 1:
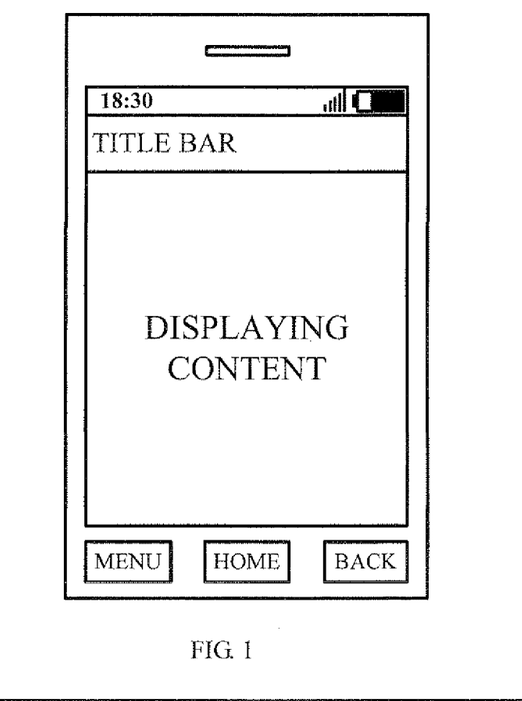
FIG. 1 is a schematic view of an interface layout of a mobile phone according to prior art.

However, regardless of the setting forms, these keys are placed on constant positions of the mobile phone, such as positions below the display screen and above the microphone, as shown in FIG. 1.

Figure 2:
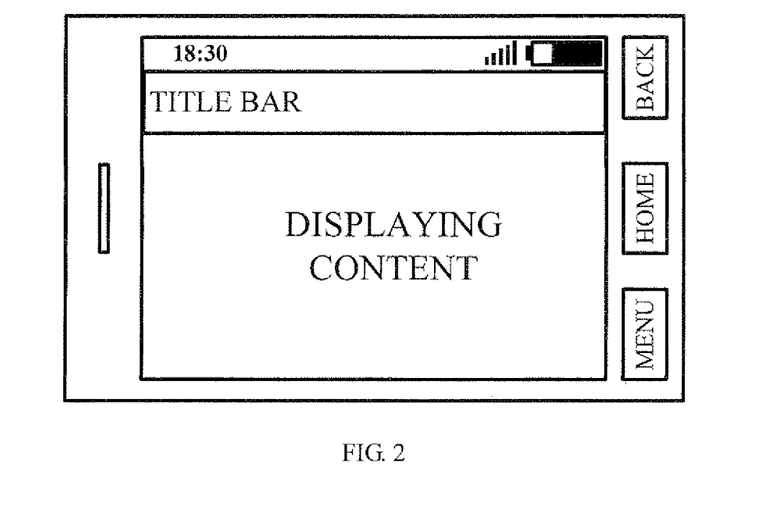
FIG. 2 is a schematic view of an interface layout of a mobile phone displayed in a landscape displaying manner according to prior art.

When user places the mobile phone in a landscape displaying manner to use, the system keys of the mobile phone is situated on the left side or right side of the user, as shown in FIG. 2. So that, it is obviously not convenient for a user to press the system keys, thereby affecting user's operation.

SUMMARY OF THE INVENTION

It is an object of the present invention to provide a display control method and a user equipment, enabling to facilitate to user's operation and improve user experience.

A display control method according to an embodiment of the present invention includes:

detecting, by a user equipment, a current screen direction in real time; and placing a system visual key in currently displayed title bar of the user equipment when the user equipment determining an occurrence of a change of the current screen direction.

Optionally, the step of detecting, by the user equipment, the current screen direction in real time includes:

adopting, by the user equipment, a G-sensor, and/or a thermal identifying device, and/or a face recognition device to detect the current screen direction in real time.

Optionally, placing the system visual key in currently displayed title bar of the user equipment includes:

obtaining a key icon by the user equipment, the key icon corresponding to the system virtual key; and performing an image processing on the currently displayed title bar and the obtained key icon to obtain a new title bar, thereby enabling the user equipment to activate the system virtual key when an area of the key icon in the new title bar being touched by user.

Optionally, prior to the step of obtaining the key icon by the user equipment, the method further includes:

virtualizing, by the user equipment, a system physical key to obtain the system virtual key; and assigning, by the user equipment, a key icon to the system virtual key.

Optionally, when currently running App includes an App virtual key, the step of performing an image processing to obtain a new title bar includes:

performing an image processing on the currently displayed title bar, the obtained key icon, and an App icon corresponding to the App visual key to obtain a new title bar.

A user equipment, according to an embodiment of the present invention, includes:

a detection unit, configured to detect current screen direction in real time; and a setting unit, configured to place a system visual key in currently displayed title bar of the user equipment when the detection unit determining an occurrence of a change of the current screen direction.

Optionally, the detection unit adopts a G-sensor, and/or a thermal identifying device, and/or a face recognition device to detect the current screen direction in real time.

Optionally, the setting unit includes:

an obtaining module, configured to obtain a key icon, the key icon corresponding to the system virtual key; and a processing module, configured to perform an image processing on the currently displayed title bar and the obtained key icon to obtain a new title bar, and display the new title bar;

the user equipment further includes:

an activation unit, configured to activate the system virtual key when an area of the key icon in the new title bar being touched by user.

Optionally, the user equipment further includes:

a virtualizing unit, configured to virtualize a system physical key to obtain the system virtual key; and an assigning unit, configured to assign a key icon to the system virtual key.

Optionally, when currently running App includes an App virtual key, the processing module is configured to perform an image processing on the currently displayed title bar, the obtained key icon, and an App icon corresponding to the App visual key to obtain a new title bar, and display the new title bar.

A display control method according to an embodiment of the present invention, includes:

detecting, by a user equipment, a current screen direction in real time;

displaying, by the user equipment, a prompting message to user when the user equipment determining an occurrence of a change of the current screen direction, the prompting message being configured to prompt user to select a position where a virtual key to be placed; and placing, by the user equipment, the visual key on the position according to user's selection.

Optionally, the step of detecting, by the user equipment, the current screen direction includes:

adopting, by the user equipment, a G-sensor, and/or a thermal identifying device, and/or a face recognition device to detect the current screen direction in real time.

Optionally, the virtual key is a system virtual key, and/or an App virtual key.

Optionally, the step of placing, by the user equipment, the visual key on the position according to user's selection includes:

performing, by the user equipment, an image processing on the currently displayed title bar and a key icon corresponding to the virtual key to obtain a new title bar, and display the new title bar, when user selecting to place the virtual key in the upper side of the currently displayed interface of the user equipment; and adjusting, by the user equipment, the currently displayed interface to enable the key icon corresponding to the virtual key to be placed on the left side, the right side, or the lower side of the currently displayed interface without the key icon covering an App interface, when user selecting to place the virtual key on the left side, the right side, or the lower side of the currently displayed interface of the user equipment.

A user equipment according to an embodiment of the present invention, includes:

a detection unit, configured to detect a current screen direction in real time;

a displaying unit, configured to display a prompting message to user when the detection unit determining an occurrence of a change of the current screen direction, the prompting message being configured to prompt user to select a position where a virtual key to be placed; and a setting unit, configured to place the visual key on the position according to user's selection.

Optionally, wherein the detection unit adopts a G-sensor, and/or a thermal identifying device, and/or a face recognition device to detect the current screen direction in real time.

Optionally, the setting unit is configured for:

performing an image processing on the currently displayed title bar and a key icon corresponding to the virtual key to obtain a new title bar, and displaying the new title bar, when user selecting to place the virtual key in the upper side of the currently displayed interface of the user equipment; and adjusting the currently displayed interface to enable the key icon corresponding to the virtual key to be placed on the left side, the right side, or the lower side of the currently displayed interface without the key icon covering an. App interface, when user selecting to place the virtual key on the left side, the right side, or the lower side of the currently displayed interface of the user equipment.

A display control method according to an embodiment of the present invention, includes:

detecting, by a user equipment, a current screen direction in real time;

obtaining a customary setting parameter of a user; and placing, by the user equipment, a visual key on corresponding position according to the customary setting parameter when the user equipment determining an occurrence of a change of the screen direction.

Optionally, the step of detecting, by the user equipment, the current screen direction in real time includes:

adopting, by the user equipment, a G-sensor, and/or a thermal identifying device, and/or a face recognition device to detect the current screen direction in real time.

Optionally, the customary setting parameter is pre-saved by user in the user equipment, and/or determined by the user equipment according to user's historical selections, and/or determined by the user equipment according to user's handheld manner.

Optionally, the virtual key is a system virtual key, and/or an App virtual key.

Optionally, the step of placing, by the user equipment, the visual key on corresponding position according to customary setting parameter of a user includes:

performing, by the user equipment, an image processing on the currently displayed title bar and a key icon corresponding to the virtual key to obtain a new title bar, and displaying the new title bar, when the customary setting parameter indicating to place the virtual key in the upper side of the currently displayed interface of the user equipment; and adjusting, by the user equipment, the currently displayed interface to enable the key icon corresponding to the virtual key to be placed on the left side, the right side, or the lower side of the currently displayed interface without the key icon covering an App interface, when the customary setting parameter indicating to place the virtual key on the left side, the right side, or the lower side of the currently displayed interface of the user equipment.

A user equipment according to an embodiment of the present invention, includes:

a detection unit, configured to detect a current screen direction in real time;

an obtaining unit, configured to obtain customary setting parameter of a user; and a setting unit, configured to place a visual key on corresponding position by the user equipment according to the customary setting parameter when the detection unit determining an occurrence of a change of the current screen direction.

Optionally, the detection unit adopts a G-sensor, and/or a thermal identifying device, and/or a face recognition device to detect the current screen direction in real time.

Optionally, the setting unit is configured for:

performing an image processing on the currently displayed title bar and a key icon corresponding to the virtual key to obtain a new title bar, and displaying the new title bar, when customary setting parameter indicating to place the virtual key in the upper side of the currently displayed interface of the user equipment; and adjusting the currently displayed interface to enable the key icon corresponding to the virtual key to be placed on the left side, the right side, or the lower side of the currently displayed interface without the key icon covering an App interface, when customary setting parameter indicating to place the virtual key on the left side, the right side, or the lower side of the currently displayed interface of the user equipment.

Several solutions are provided according to embodiments of the present invention, advantages of the solutions are illustrated as follows:

For Solution One:

The user equipment can detect the current screen direction in real time, when the user equipment determines an occurrence of a change of the screen direction, system visual keys can be placed in the currently displayed title bar of the user equipment. Because the system visual keys can be placed in the currently displayed title bar of the user equipment when the user equipment is in a landscape displaying manner, such that user does not have to operate the system virtual keys on the right side or the left side of the mobile phone, and can directly operate in the currently displayed title bar in the upper side of the currently displayed interface of the user equipment, thereby facilitating to user's operation and improving user experience.

In addition to that, after the system visual keys being placed in the current displayed title bar of the user equipment, previous displaying area configured for displaying the system visual keys can be released, and much more content can be displayed on the screen, thereby further improving user experience.

For Solution Two:

The user equipment can detect the current screen direction in real time, when the user equipment determines an occurrence of a change of the screen direction, it can display prompting message to user, to prompt user to select positions where the virtual keys to be placed, and the user equipment can place the system virtual keys on corresponding positions according to user's selection. As the virtual keys can be placed according to user's selection when the screen direction changes, thereby enabling to meet user's individual requirement and facilitating to user's operation, and improving user experience.

For Solution Three:

The user equipment can determine the current screen direction in real time. When the user equipment determines an occurrence of a change of the current screen direction, the user equipment can obtain customary setting parameters of a user and place the system visual keys to corresponding positions according to the customary setting parameters. As the virtual keys can be placed according to customary setting parameters of a user when the screen direction changes, thereby enabling to meet user's individual requirement of user and facilitating to user's operation, and improving user experience

DETAILED DESCRIPTION OF THE EMBODIMENTS

The embodiment of the present invention provides a display control method and a user equipment, which can facilitate to user's operation and improve user experience.

Figure 3:
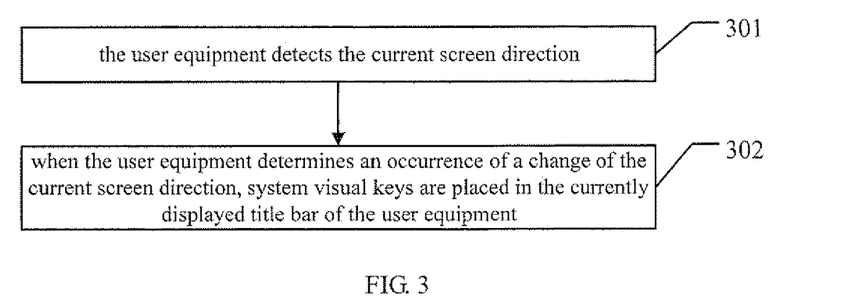
FIG. 3 is a schematic view of a display control method according to an embodiment of solution one of the present invention.

Embodiments of the present invention provides several solutions to improve user experience, which are illustrated respectively as follows:

Solution one: in this solution, when the user equipment detects an occurrence of a change of the screen direction, system visual keys or App visual keys can be placed in the title bar by default. Referring to FIG. 3 for the details, the display control method according to an embodiment of solution one of the present invention includes:

301, the user equipment detects the current screen direction;

In the embodiment, the user equipment can detect the current screen direction in real time. Specifically, the user equipment may adopt a G-sensor, and/or a thermal identifying device, and/or a face recognition device to detect the current screen direction in real time.

For example, the user equipment can detect current gravity direction via a built in G-sensor, thereby determining the screen direction. The user equipment may adopt a built in thermal identifying device to sense a hand holding position of user, thereby determining the screen direction. The user equipment may adopt a built in face recognition device to identify a face direction of user, thereby determining the screen direction.

It can be understood that, above-mentioned are several ways to detect the current screen direction. In practical application, the user equipment may adopt one or a combination of several ways selected from a group of above-mentioned ways. The user equipment may adopt other similar detection ways, and specific details are not limited herein.

302, when the user equipment determines an occurrence of a change of the current screen direction, system visual keys are placed in the currently displayed title bar of the user equipment.

In the embodiment, the occurrence of a change of the screen direction may be a change from a landscape displaying manner to a portrait displaying manner, or a change from a portrait displaying manner to a landscape displaying manner, specific details are not limited herein.

When the user equipment determines an occurrence of a change of the current screen direction, system visual keys can be placed in the currently displayed title bar of the user equipment. The system visual keys include but not limit to "MENU", "HOME", and "BACK" keys.

In the embodiment, the user equipment can determine the current screen direction in real time. When the user equipment determines an occurrence of a change of the current screen direction, system visual keys can be placed in the currently displayed title bar of the user equipment. As the system visual keys can be placed in the current displayed title bar of the user equipment when the screen is in a landscape displaying manner, such that user does not have to operate the system visual keys on the left side or the right side of the mobile phone, and can directly perform an operation on the title bar on the upper side of the current displaying interface of the user equipment, thereby facilitating to user's operation and improving user experience.

In addition to that, after the system visual keys being placed in the currently displayed title bar of the user equipment, previous displaying area configured for displaying the system visual keys can be released, and much more content can be displayed on the screen, thereby further improving user experience.

Figure 4:
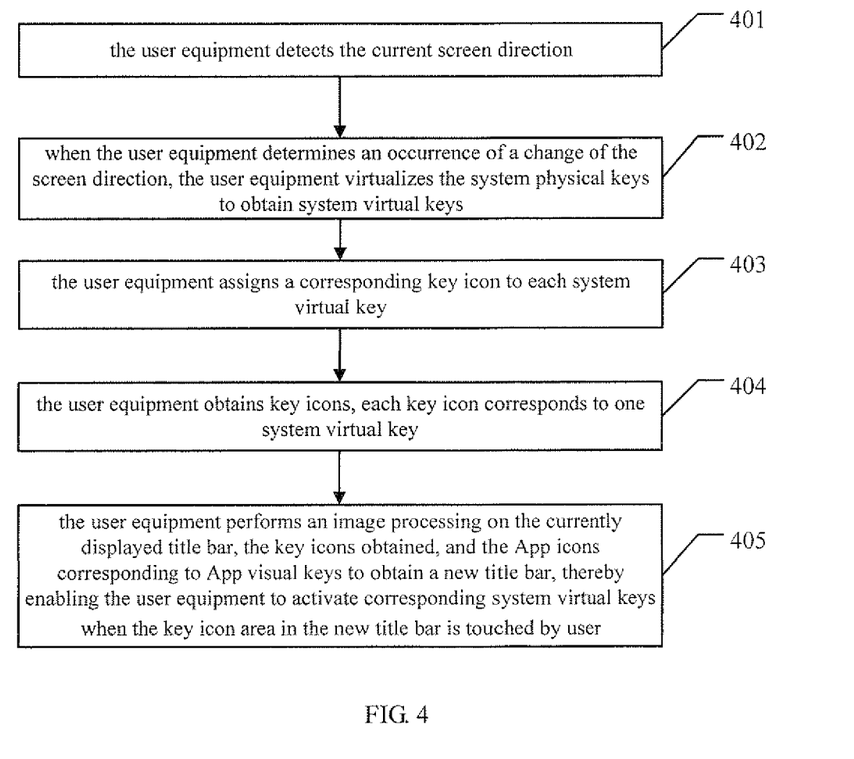
FIG. 4 is a schematic view of a display control method according to another embodiment of solution one of the present invention.

In order to make it easier to understand, a more specific embodiment is described as follows to illustrate the solution. Referring to FIG. 4, the display control method according to another embodiment of solution one includes:

401, the user equipment detects the current screen direction;

In the embodiment, the user equipment can detect the current screen direction in real time. Specifically, the user equipment may adopt a G-sensor, and/or a thermal identifying device, and/or a face recognition device to detect the current screen direction in real time.

For example, the user equipment can detect current gravity direction via a built in G-sensor, thereby determining the screen direction. The user equipment may adopt a built in thermal identifying device to sense a hand holding position of user, thereby determining the screen direction. The user equipment may adopt a built in face recognition device to identify a face direction of user, thereby determining the screen direction.

It can be understood that, above-mentioned are several ways to detect the current screen direction. In practical application, the user equipment may adopt one or a combination of several ways selected from a group of above-mentioned ways. The user equipment may adopt other similar detection ways, and specific details are not limited herein.

The user equipment of the embodiment can be a mobile phone, or other similar equipment, for example, a tablet PC, a PDA (personal digital assistance) and so on, hereby the mobile phone is illustrated as an example.

402, when the user equipment determines an occurrence of a change of the screen direction, the user equipment virtualizes the system physical keys to obtain system virtual keys.

In the embodiment, the occurrence of a change of the screen direction may be a change from a landscape displaying manner to a portrait displaying manner, or a change from a portrait displaying manner to a landscape displaying manner, specific details are not limited herein. Hereby, the change from a portrait displaying manner to a landscape displaying manner is illustrated as an example.

When the user equipment determines an occurrence of a change of the screen direction, the system physical keys can be virtualized to obtain system virtual keys.

It should be noted that, this step is specifically directed to a situation that the user equipment originally employs system physical keys. If the user equipment itself originally employs system virtual keys, it does not have to carry out this step.

403, the user equipment assigns a corresponding key icon to each system virtual key. After the user equipment virtualizes the system physical keys to obtain system virtual keys, each system virtual key can be assigned with a corresponding key icon. The key icons correspond to the system virtual keys.

Similar to step 402, if the user equipment itself originally employs system virtual keys, it does not have to carry out this step.

404, the user equipment obtains key icons, each key icon corresponds to one system virtual key.

After the user equipment assigns key icon to each system virtual key, the user equipment can obtain these key icons, probably, if the user equipment itself originally employs system virtual keys, the user equipment can directly obtain these key icons.

405, the user equipment performs an image processing on the currently displayed title bar, the obtained key icons, and the App icons corresponding to App visual keys to obtain a new title bar, thereby enabling the user equipment to activate corresponding system virtual keys when an area of the key icon in the new title bar is touched by user.

In the embodiment, if the currently running App includes App virtual keys. Then the user equipment performs an image processing on the currently displayed title bar, the obtained key icons, and the App icons corresponding to App visual keys to obtain a new title bar.

If the currently running App does not include App virtual keys. Then the user equipment can merely perform an image processing on the currently displayed title bar and the obtained key icons to obtain a new title bar.

The image processing according to the embodiment can be a superposition of multiple image layers, and also may be a repainting of the title bar, and also may be other processing procedure, only enough to enable the key icons appear in the new title bar. The specific details of the image processing procedure is known for a person skilled in the art, and are not described herein again. But during the images processing, in order not to influence user's normal browsing, zoom or skewing can be applied to the key icons or the App icons to prevent covering the content of the title bar.

After the user equipment generates the new title bar, the new title bar can be displayed on the screen for user.

Because the keys icons correspond to system visual keys, such that when the area of the key icon in the new title bar is touched by user, the user equipment can activate corresponding system virtual key, equaling to a result of the system visual key being pressed.

It should be noted that, if the new title bar further includes App icons, thus when an area of the App icons are touched by user, the user equipment also activates corresponding App virtual key, equaling to a result of the App visual key being pressed.

Figure 5:
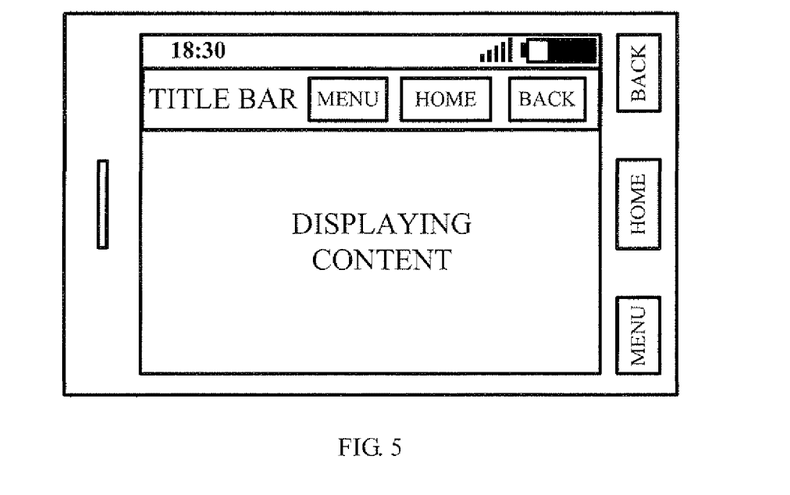
FIG. 5 is a schematic view of a displaying effect of the mobile phone of solution one of the present invention in a landscape displaying manner.

In order to directly express a displaying effect according to the embodiment, referring to FIG. 5, in FIG. 5, the "MENU", "HOME" and "BACK" keys are all placed in the title bar, thereby facilitating to user's touch. It can be understood that, in practical application, the "MENU", "HOME" and "BACK" keys on the right side of the screen in FIG. 5 can be system physical keys or system virtual keys. If they are system virtual keys, they can be hidden, and only be shown in the title bar. If they are system physical keys, functions of these system physical keys can be directly applied to corresponding virtual keys displayed the title bar, and these system physical keys are replaced by corresponding virtual keys, to prevent these system physical keys from being activated when being pressed.

It is can be understood, in practical application, the steps in the embodiment can be realized by physical devices (such as CPU, LCD, GPU and so on) of the user equipment coordinately.

In the embodiment, the user equipment can detect the current screen direction in real time, when the user equipment determines an occurrence of a change of the screen direction, system visual keys can be placed in the currently displayed title bar of the user equipment. Because the system visual keys can be placed in the currently displayed title bar of the user equipment when the user equipment is in a landscape displaying manner, such that user does not have to operate the system virtual keys on the right side or the left side of the mobile phone, and can directly operate in the currently displayed title bar in the upper side of the currently displayed interface of the user equipment, thereby facilitating to user's operation and improving user experience.

In addition to that, after the system visual keys being placed in the current displayed title bar of the user equipment, previous displaying area configured for displaying the system visual keys can be released, and much more content can be displayed on the screen, thereby further improving user experience.

Figure 6:
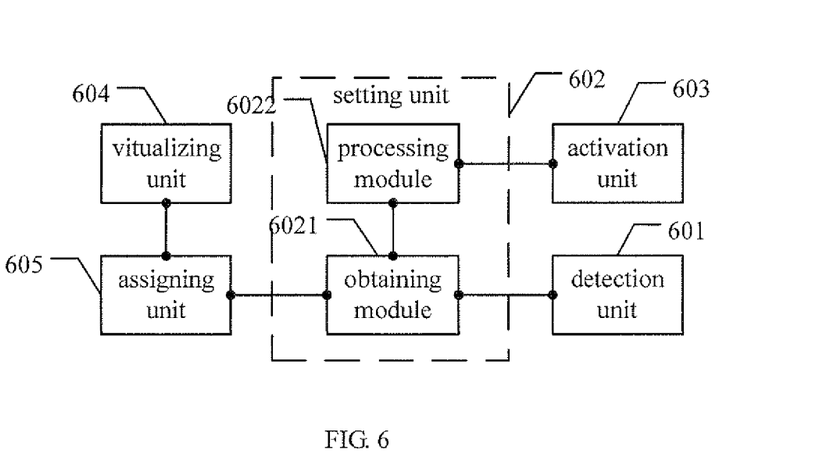
FIG. 6 is a schematic view of a user equipment according to an embodiment of solution one of the present invention.

Above-illustrated is a display control method according to the solution one of the present invention. The corresponding equipment is illustrated as follows. Referring to FIG. 6, the user equipment according to the solution one of the present invention includes:

A detection unit 601, configured to detect the current screen direction in real time;

A setting unit 602, configured to place system visual keys in the currently displayed title bar of the user equipment when the user equipment determines an occurrence of a change of the screen direction.

In the embodiment, the detection unit 601 may adopt a G-sensor, and/or a thermal identifying device, and/or a face recognition device to detect the current screen direction in real time.

The detection unit 601 can detect current gravity direction via a G-sensor built in the user equipment, thereby determining the screen direction. The detection unit 601 may adopt a thermal identifying device built in the user equipment to sense a hand holding position of user, thereby determining the screen direction. The detection unit 601 may adopt a face recognition device built in the user equipment to identify a face direction of user, thereby determining the screen direction.

The setting unit 602 according to the embodiment can further includes:

An obtaining module 6021, configured to obtain key icons, each key icon corresponding to one system virtual key.

A processing module 6022, configured to perform an image processing on the currently displayed title bar and the obtained key icons to obtain a new title bar, and display the new title bar.

The user equipment according to the embodiment can further includes:

An activation unit 603, configured to activate corresponding system virtual keys when an area of the key icon in the new title bar is touched by user.

It is should be noted that, in the embodiment, if the currently running App includes App virtual keys. Then the processing module 6022 is particularly configured to perform an image processing on the currently displayed title bar, the obtained key icons, and the App icons corresponding to App visual keys to obtain a new title bar, and display the new title bar.

When the user equipment adopts system physical keys, the user equipment further includes:

A virtualizing unit 604, configured to virtualize the system physical keys to obtain system virtual keys;

An assigning unit 605, configured to assign key icon to each system virtual key. Functions of units of the user equipment, connections between the units, and communication processes between the units are as same as the content of the method embodiment in above-mentioned FIG. 3 and FIG. 4, and details are not described herein again.

The user equipment according to the embodiment are illustrated above from a point of function division. It is can be understood that, in practical application, the physical devices of the user equipment can respectively accomplish such functions, for example:

The user equipment may include a CPU, a GPU, a display screen and a touch screen.

Wherein, the CPU can obtain key icons, and call the GPU to perform an image processing on the currently displayed title bar and the obtained key icons to obtain a new title bar, thereafter, the CPU calls the display screen to display the new title bar.

The CPU can further monitor touch signal of the touch screen in real time, when the area of the key icon in the new title bar is touched by user, the CPU can activate corresponding system virtual keys.

Moreover, if the user equipment originally does not include system virtual keys, the CPU can virtualize the system physical keys to obtain system virtual keys and assign key icon to each system virtual key.

It is should be noted that, above-described are operations of the physical devices of the user equipment according to only one example. However, in practical application, due to different combinations or connection types of the physical devices, there are more operation modes, for example, such as an operation mode of an integration of GPU and GPU, and so on, and specific details are not limited herein.

In the embodiment, the detection unit 601 can determine the current screen direction in real time. When the user equipment determines an occurrence of a change of the current screen direction, the setting unit 602 can place system visual keys in the currently displayed title bar of the user equipment. As the system visual keys can be placed in the current displayed title bar of the user equipment when the user equipment is in a landscape displaying manner, such that user does not have to operate the system virtual keys on the right side or the left side of the mobile phone, and can directly operate in the currently displayed title bar in the upper side of the currently displayed interface of the user equipment, thereby facilitating to user's operation and improving user experience.

In addition to that, after the system visual keys being placed in the current displayed title bar of the user equipment, previous displaying area configured for displaying the system visual keys can be released, thus much more content can be displayed on the screen, thereby further improving user experience.

Figure 7:
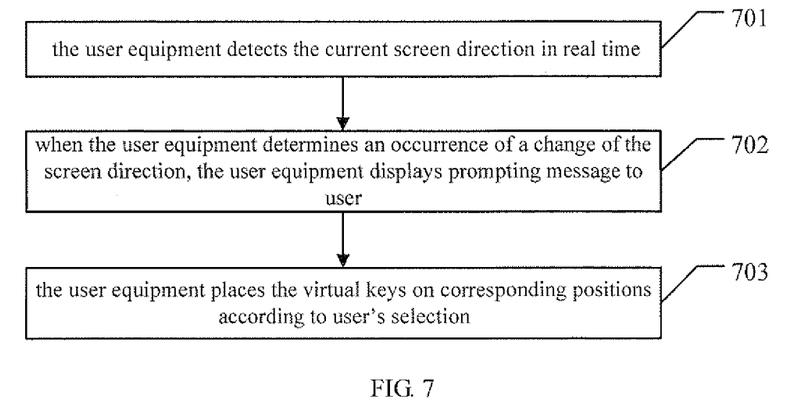
FIG. 7 is a schematic view of a display control method according to an embodiment of a solution two of the present invention.

Solution Two:

In this solution, when the user equipment determines an occurrence of a change of the screen direction, it can prompt user to make a selection, and place the system virtual keys or App virtual keys to corresponding positions according to user's selection. Specifically referring to FIG. 7, the display control method according to an embodiment of the solution two of the present invention includes:

701, the user equipment detects the current screen direction in real time;

In the embodiment, the user equipment can detect the current screen direction in real time. Specifically, the user equipment may adopt a G-sensor, and/or a thermal identifying device, and/or a face recognition device to detect the current screen direction in real time.

For example, the user equipment can detect current gravity direction via a built in G-sensor, thereby determining the screen direction. The user equipment may adopt a built in thermal identifying device to sense a hand holding position of user, thereby determining the screen direction. The user equipment may adopt a built in face recognition device to identify a face direction of user, thereby determining the screen direction.

It can be understood that, above-mentioned are several ways to detect the current screen direction. In practical application, the user equipment may adopt one or a combination of several ways selected from a group of above-mentioned ways. The user equipment may adopt other similar detection ways, and specific details are not limited herein.

The user equipment of the embodiment can be a mobile phone, or other similar equipments, for example, a tablet PC, a PDA (personal digital assistance), herein takes the mobile phone as an example to illustrate.

702, when the user equipment determines an occurrence of a change of the screen direction, the user equipment displays prompting message to user.

In the embodiment, the occurrence of a change of the screen direction may be a change from a landscape displaying manner to a portrait displaying manner, or a change from a portrait displaying manner to a landscape displaying manner. Hereby, the change from a portrait displaying manner to a landscape displaying manner is illustrated as an example.

Figure 8:
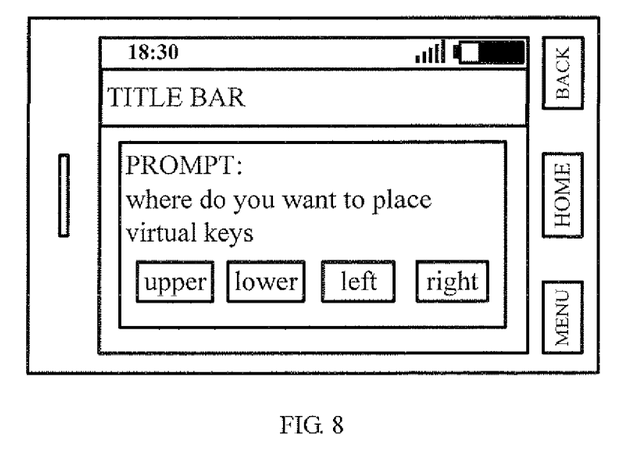
FIG. 8 is a schematic view of a displaying effect of a mobile phone of solution two of the present invention in a landscape displaying manner.

When the user equipment determines an occurrence of a change of the screen direction, prompting message can be displayed to user. The specific content of the prompting message can be a request for user to select positions where the virtual keys to be placed, specific effect is shown in FIG. 8. When the user equipment determines that the screen is in a landscape displaying manner, a dialog-box can be popped up, the dialog-box can prompt user to select positions where the virtual keys to be placed.

It can be understood, in practical application, the user equipment can adopt much more modes to prompt user to select positions where the virtual keys to be placed, such as a voice mode, a vibration mode, and specific details are not limited herein.

703, the user equipment places the virtual keys on corresponding positions according to user's selection.

After the user has selected, the user equipment places the virtual keys on corresponding positions according to user's selection.

In the embodiment, the virtual keys can be system virtual keys, and/or App virtual keys. It should be noted that, if the currently running App includes App virtual keys, then the virtual keys can be system virtual keys and App virtual keys. If the currently running App does not include App virtual keys, thus the virtual keys are merely system virtual keys.

It can be understood that, in practical application, the system virtual keys and the App virtual keys can be respectively prompted for user to select, and the system virtual keys and the App virtual keys can be uniformly prompted for user to select. That is, the positions where the system virtual keys to be placed selected by user can be same as that of the App virtual keys. The positions where the system virtual keys to be placed selected by user can be different from that of the App virtual keys, and specific details are not limited herein.

It should be noted that, if user selects to place the virtual keys in the upper side of the currently displayed interface of the user equipment, thus the user equipment performs an image processing on the currently displayed title bar and the key icons corresponding to the virtual keys to obtain a new title bar, and displays the new title bar.

If user selects to place the virtual keys on the left side, the right side, or the lower side of the currently displayed interface of the user equipment, thus the user equipment adjust the currently displayed interface to enable the key icons corresponding to the virtual keys to be placed on the left side, the right side, or the lower side of the currently displayed interface without icons covering the App interface.

Above-mentioned are several specific placement modes, it can be understood that, in practical application, the user equipment can adopt much more placement modes, specific details are not limited herein.

It is can be understood, in practical application, the steps in the embodiment can be realized by physical devices (such as CPU, LCD, GPU and so on) of the user equipment coordinately.

In the embodiment, the user equipment can detect the current screen direction in real time, when the user equipment determines an occurrence of a change of the screen direction, it can display prompting message to user to select positions where the virtual keys to be placed, and the user equipment can place the system virtual keys on corresponding positions according to user's selection. As the virtual keys can be placed according to user's selection when the screen direction changes, thereby enabling to meet user's individual requirement and facilitating to user's operation, and improving user experience.

Figure 9:
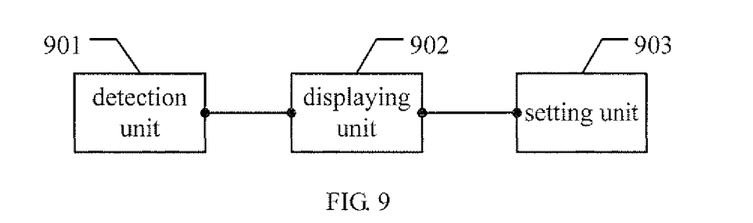
FIG. 9 is a schematic view of a user equipment according to an embodiment of solution two of the present invention.

Above-illustrated is a display control method according to the solution two of the present invention. The corresponding equipment is illustrated as follows, referring to FIG. 9, the user equipment according to the solution two of the present invention includes:

A detection unit 901, configured to detect the current screen direction in real time;

A displaying unit 902, configured to display prompting message to user, the specific content of the prompting message can be a request for user to select positions where the virtual keys to be placed, specific effect is shown in FIG. 8. When the user equipment determines that the screen is in a landscape displaying manner, a dialog-box can be popped up, the dialog-box can prompt user to select positions where the virtual keys to be placed;

A setting unit 903, configured to place the system virtual keys on corresponding positions according to user's selection.

In the embodiment, the detection unit 901 may adopt a G-sensor, and/or a thermal identifying device, and/or a face recognition device to detect the current screen direction in real time.

The detection unit 901 can detect current gravity direction via a G-sensor built in the user equipment, thereby determining the screen direction. The detection unit 901 may adopt a thermal identifying device built in the user equipment to sense a hand holding position of user, thereby determining the screen direction. The detection unit 901 may adopt a face recognition device built in the user equipment to identify a face direction of user, thereby determining the screen direction.

In the embodiment, if user selects to place the virtual keys in the upper side of the currently displayed interface of the user equipment, thus the setting unit 903 can perform an image processing on the currently displayed title bar and the key icons corresponding to the virtual keys to obtain a new title bar, and display the new title bar.

If user selects to place the virtual keys on the left side, the right side, or the lower side of the currently displayed interface of the user equipment, thus the setting unit 903 can adjust the currently displayed interface to enable the key icons corresponding to the virtual keys to be placed on the left side, the right side, or the lower side of the currently displayed interface without icons covering the App interface.

In the embodiment, functions of units of the user equipment, connections between the units, and communication processes between the units are as same as the content of the method embodiment in above-mentioned FIG. 7, and details are not described herein again.

The user equipment according to the embodiment are illustrated above from a point of function division. It is can be understood that, in practical application, the physical devices of the user equipment can respectively accomplish such functions, for example:

The user equipment can include a CPU, a GPU, a display screen and a touch screen.

Wherein, the CPU can detect the current screen direction, when the user equipment determines an occurrence of a change of the current screen direction, the display screen can be called to display prompting message to user. The specific content of the prompting message can be a request for user to select positions where the virtual keys to be placed.

After the user makes a selection, the CPU can call the GPU to adjust the currently displayed interface to enable the virtual keys to be placed on corresponding positions according to user's selection Moreover, if the user equipment does not includes system virtual keys originally, the CPU can virtualize the system physical keys to obtain system virtual keys and assign key icon to each system virtual key.

It is should be noted that, above-described are operations of the physical devices of the user equipment according to only one example. However, in practical application, due to different combinations or connection types of the physical devices, there are more operation modes, for example, such as an operation mode of an integration of GPU and GPU, and so on, and specific details are not limited herein.

In the embodiment, the detection unit 901 can detect the current screen direction in real time, when the user equipment determines an occurrence of a change of the current screen direction, the displaying unit 902 can display prompting message to user to select positions where the virtual keys to be placed, and the setting unit 903 can place the system virtual keys on corresponding positions according to user's selection. As the virtual keys can be placed according to user's selection when the screen direction changes, thereby enabling to meet user's individual requirement and facilitating to user's operation, and improving user experience.

Figure 10:
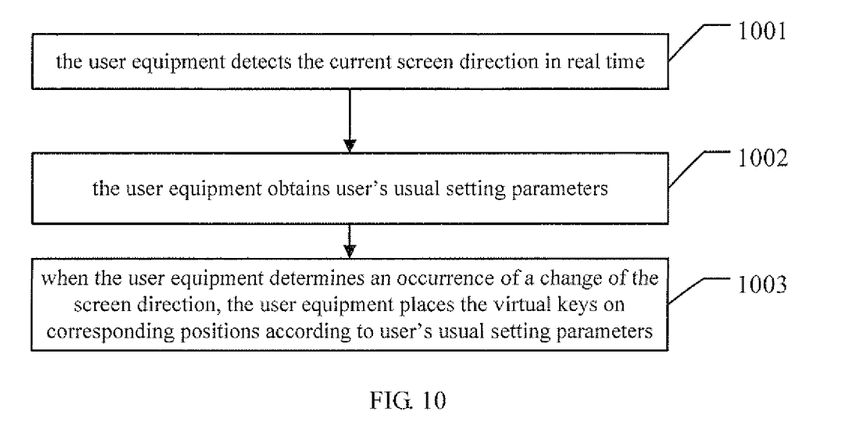
FIG. 10 is a schematic view of a display control method according to an embodiment of solution three of the present invention.

The Solution Three:

In this solution, when the user equipment determines an occurrence of a change of the screen direction, it can obtain customary setting parameters of a user, and place the virtual keys on corresponding positions according to customary setting parameters of a user. Specifically referring to FIG. 10, the display control method according to an embodiment of the solution three of the present invention includes:

1001, the user equipment detects the current screen direction in real time;

In the embodiment, the user equipment can detect the current screen direction in real time. In detail, the user equipment may adopt a G-sensor, and/or a thermal identifying device, and/or a face recognition device to detect the current screen direction in real time.

For example, the user equipment can detect current gravity direction via a built in G-sensor, thereby determining the screen direction. The user equipment may adopt a built in thermal identifying device to sense a hand holding position of user, thereby determining the screen direction. The user equipment may adopt a built in face recognition device to identify a face direction of user, thereby determining the screen direction.

It can be understood that, above-mentioned are several ways to detect the current screen direction. In practical application, the user equipment may adopt one or a combination of several ways selected from a group of above-mentioned ways. The user equipment may adopt other similar detection ways, and specific details are not limited herein.

The user equipment of the embodiment can be a mobile phone, or other similar equipments, for example, a tablet PC, a PDA (personal digital assistance), herein takes the mobile phone as an example to illustrate.

1002, customary setting parameters of a user is obtained;

In the embodiment, the occurrence of a change of the screen direction may be a change from a landscape displaying manner to a portrait displaying manner, or a change from a portrait displaying manner to a landscape displaying manner. Hereby, the change from a portrait displaying manner to a landscape displaying manner is illustrated as an example.

User equipment can obtain customary setting parameters of a user, the customary setting parameters is pre-saved in the user equipment by user, for example, user can preset "placing virtual keys on the left side when the user equipment is in a landscape displaying manner" or "placing virtual keys on the upper side when the user equipment is in a landscape displaying manner", and so on.

The customary setting parameters may be determined by the user equipment according to user's historical selections. For example, when adopting above-mentioned method of the solution two, if the user equipment determines that user has selected to place virtual keys on the upper side when the user equipment is in a landscape displaying manner for consecutive several times, "placing virtual keys on the upper side when the user equipment is in a landscape displaying manner" can be set as customary setting parameters. When the user equipment determines that it in a landscape again, user may not be prompted to make a selection, the user equipment can be directly set according to the customary setting parameters.

The customary setting parameters may be determined by the user equipment according to user's handheld manner. For example, the user equipment can detect whether the user holding by left hand or by right hand, if the user equipment determines that user holds by left hand for consecutive several times, thus "placing virtual keys on the left side when the user equipment is in a landscape displaying manner" can be set as customary setting parameters.

It can be understood that, in practical application, the user equipment can adopt much more ways to obtain customary setting parameters, specifically details are not limited herein.

1003, when the user equipment determines an occurrence of a change of the screen direction, the user equipment places the virtual keys on corresponding positions according to customary setting parameters of a user.

When the user equipment determines an occurrence of a change of the screen direction, the virtual keys can be placed on corresponding positions according to user customary setting parameters.

In the embodiment, the virtual keys can be system virtual keys, and/or App virtual keys. It should be noted that, if the currently running App includes App virtual keys, then the virtual keys can be system virtual keys and App virtual keys. If the currently running App does not include App virtual keys, thus the virtual keys can merely be system virtual keys.

It can be understood that, in practical application, the system virtual keys and the App virtual keys can adopt different customary setting parameters or the same customary setting parameters. That is, the positions where the system virtual keys to be placed by the user equipment according to the customary setting parameters can be same as that of the App virtual keys, or can be different from that of the App virtual keys, and specific details are not limited herein.

It is should be noted that, when the customary setting parameter indicates to place the virtual keys on the upper side of the currently displayed interface of the user equipment, thus the user equipment performs an image processing on the currently displayed title bar and the key icons corresponding to the virtual keys to obtain a new title bar, and displays the new title bar.

If the customary setting parameters indicate to place the virtual keys on the left side, the right side, or the lower side of the currently displayed interface of the user equipment, thus the user equipment adjust the currently displayed interface to enable the key icons corresponding to the virtual keys to be placed on the left side, the right side, or the lower side of the currently displayed interface without icons covering the App interface.

It is can be understood, in practical application, the steps in the embodiment can be accomplished by physical devices (such as CPU, LCD, GPU and so on) of the user equipment coordinately.

In the embodiment, the user equipment can determine the current screen direction in real time. When the user equipment determines an occurrence of a change of the current screen direction, the user equipment can obtain customary setting parameters of a user and place the system visual keys to corresponding positions according to the customary setting parameters. As the virtual keys can be placed according to customary setting parameters of a user when the screen direction changes, thereby enabling to meet user's individual requirement of user and facilitating to user's operation, and improving user experience.

Figure 11:
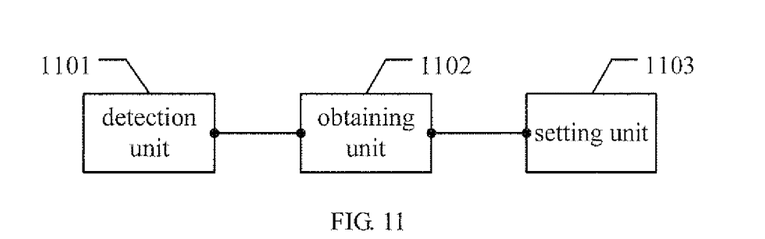
FIG. 11 is a schematic view of a user equipment according to an embodiment of solution three of the present invention.

Above-illustrated is a display control method according to the solution three of the present invention. The corresponding equipment is illustrated as follows. Referring to FIG. 11, the user equipment according to the solution three of the present invention includes:

A detection unit 1101, configured to detect the current screen direction in real time;

An obtaining unit 1102, configured to obtain customary setting parameters of a user;

A setting unit 1103, configured to place the system virtual keys on corresponding positions according to user's selection when the user equipment determines an occurrence of a change of the screen direction.

In the embodiment, the detection unit 1101 may adopt a G-sensor, and/or a thermal identifying device, and/or a face recognition device to detect the current screen direction in real time.

The detection unit 1101 may detect current gravity direction via a G-sensor built in the user equipment, thereby determining the screen direction. The detection unit 1101 may adopt a thermal identifying device built in the user equipment to sense a hand holding position of user, thereby determining the screen direction. The detection unit 1101 may adopt a face recognition device built in the user equipment to identify a face direction of user, thereby determining the screen direction.

When the customary setting parameters indicate to place the virtual keys on the upper side of the currently displayed interface of the user equipment, thus the setting unit 1103 performs an image processing on the currently displayed title bar and the key icons corresponding to the virtual keys to obtain a new title bar, and displays the new title bar.

If the customary setting parameters indicate to place the virtual keys on the left side, the right side, or the lower side of the currently displayed interface of the user equipment, thus the setting unit 1103 adjust the currently displayed interface to enable the key icons corresponding to the virtual keys to be placed on the left side, the right side, or the lower side of the currently displayed interface without icons covering the App interface.

In the embodiment, functions of units of the user equipment, connections between the units, and communication processes between the units are as same as the content of the method embodiment in above-mentioned FIG. 10, and details are not described herein again.

The user equipment according to the embodiment are illustrated above from a point of function division. It is can be understood that, in practical application, the physical devices of the user equipment can respectively accomplish such functions, for example:

The user equipment can include a CPU, a GPU, a display screen and a touch screen.

Wherein, the CPU can detect the current screen direction in real time, and can obtain customary setting parameters of a user from a storage. When the occurrence of a change of the screen direction has been determined, the CPU can call the GPU to adjust current display interface to enable the virtual keys to be placed on corresponding positions according to customary setting parameters.

Moreover, if the user equipment does not includes system virtual keys originally, the CPU can virtualize the system physical keys to obtain system virtual keys and assign key icon to each system virtual key.

It is should be noted that, above-described are operations of the physical devices of the user equipment according to only one example. However, in practical application, due to different combinations or connection types of the physical devices, there are many operation modes, for example, such as an operation mode of an integration of GPU and GPU, and so on, and specific details are not limited herein.

In the embodiment, the detection unit 1101 can determine the current screen direction in real time. When the user equipment determines an occurrence of a change of the current screen direction, the obtaining unit 1102 can obtain customary setting parameters of a user, the setting unit 1103 can place the visual keys on correspondingly positions according to the customary setting parameters. As the virtual keys can be placed according to customary setting parameters of a user when the screen direction changes, thereby enabling to meet user's individual requirement of user and avoiding user to select for each time, such that it facilitates to user's operation, and improves user experience.

It may be clearly understood by a person skilled in the art that, for the purpose of convenient and brief description, for a detailed working process of the foregoing system, apparatus, and unit, reference may be made to a corresponding process in the method embodiments, and details are not described herein again.

In the embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions of the embodiments.

In addition, the functional units in the embodiment of the invention can be all integrated into one processing module or located individually; two or more functional units can be integrated into one module. The integrated module may be realized in the format of hardware or software functional module.

When the integrated unit is implemented in the form of a software functional unit and is sold or used as an independent product, the integrated unit may be stored in a computer readable storage medium. Based on this understanding, all technical solutions of the present invention or a part that makes contributions to the prior art or all or part of the technical solutions may be essentially embodied in the form of a software product. The computer software product may be stored in a storage medium, and includes a number of instructions that enable a piece of computer equipment (may be a personal computer, a server, or network equipment) to execute all or part of steps of the method described in each embodiment of the present invention. The preceding storage medium may be any medium capable of storing program codes, such as, a U disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A display control method, comprising:
   virtualizing, by a user equipment, a system physical key to obtain a system virtual key;
   detecting, by the user equipment, a current screen direction in real time;
   placing the system virtual key in currently displayed title bar of the user equipment in response to the user equipment determining an occurrence of a change of the current screen direction from a first orientation to a second orientation;
   removing the system virtual key in the currently displayed title bar of the user equipment in response to the user equipment determining an occurrence of a change of the current screen direction from the second orientation to the first orientation; and
   enabling the user equipment to perform function of the system physical key which is virtualized to obtain the system virtual key if the system virtual key in currently displayed title bar is touched by user.

2. The method according to claim 1, wherein the step of detecting, by the user equipment, the current screen direction in real time comprises:
   adopting, by the user equipment, a G-sensor, and/or a thermal identifying device, and/or a face recognition device to detect the current screen direction in real time.

3. The method according to claim 1, wherein the step of placing the system visual key in the currently displayed title bar of the user equipment comprises: obtaining a key icon by the user equipment, the key icon corresponding to the system virtual key; and performing an image processing on the currently displayed title bar and the obtained key icon to obtain a new title bar, zooming or skewing the obtained key icon to prevent covering the content of the new title bar during the image processing; thereby enabling the user equipment to activate the system virtual key if an area of the key icon in the new title bar is touched by user.

4. The method according to claim 3, wherein prior to the step of obtaining the key icon by the user equipment, the method further comprises:
   assigning, by the user equipment, a key icon to the system virtual key.

5. The method according to claim 3, wherein when a currently running App comprises an App virtual key, the step of performing an image processing to obtain a new title bar comprises:
   performing an image processing on the currently displayed title bar, the obtained key icon, and an App icon corresponding to the App virtual key to obtain a new title bar.

6. A user equipment, comprising:
   a virtualizing unit, configured to virtualize a system physical key to obtain a system virtual key;
   a detection unit, configured to detect current screen direction in real time;
   a setting unit, configured to place the system virtual key in currently displayed title bar of the user equipment in response to the detection unit determining an occurrence of a change of the current screen direction from a first orientation to a second orientation; and
   an activation unit, configured to enable the user equipment to perform function of the system physical key which is virtualized to obtain the system virtual key if the system virtual key in currently displayed title bar is touched by user;
   wherein the setting unit is further configured to remove the system virtual key in currently displayed title bar of the user equipment in response to the detection unit determining an occurrence of a change of the current screen direction from the second orientation to the first orientation.

7. The user equipment according to claim 6, wherein the detection unit adopts a G-sensor, and/or a thermal identifying device, and/or a face recognition device to detect the current screen direction in real time.

8. The user equipment according to claim 6, wherein the setting unit comprises:
   an obtaining module, configured to obtain a key icon, the key icon corresponding to the system virtual key; and
   a processing module, configured to perform an image processing on the currently displayed title bar and the obtained key icon to obtain a new title bar, zoom or skew the obtained key icon to prevent covering the content of the new title bar during the image processing, and display the new title bar;

wherein the activation unit is further configured to activate the system virtual key in response to an area of the key icon in the new title bar is touched by user.

9. The user equipment according to claim 8, wherein the user equipment further comprises:
an assigning unit, configured to assign a key icon to the system virtual key.

10. The user equipment according to claim 6, wherein when a currently running App comprises an App virtual key, the processing module is configured to perform an image processing on the currently displayed title bar, the obtained key icon, and an App icon corresponding to the App virtual key to obtain a new title bar, and display the new title bar.

11. A user equipment configured to auto-adjust the display of content between a landscape mode and a portrait mode in response to an orientation of the user equipment in a landscape orientation and a portrait orientation, respectively, the user equipment comprising:
at least one physical key;
a detection unit configured to determine if the user equipment is positioned in landscape orientation or portrait orientation;
a first virtual key set stored in memory, comprising a plurality of virtual keys, the first virtual key set lacking any virtual keys that correspond to the at least one physical key;
a second virtual key set stored in memory, including virtual keys corresponding to the at least one physical key;
the user equipment being configured to:
display the first virtual key set but not the second virtual key set in response to the detection unit determining that the user equipment is in one of the portrait orientation and the landscape orientation;
display the first and second virtual key set in response to the detection unit determining that the user equipment is in the other of the portrait orientation and the landscape orientation;
wherein the user equipment is controlled in one of the portrait orientation and the landscape orientation through the at least one physical key and the first virtual key set;
wherein the user equipment is controlled in the other of the portrait orientation and the landscape orientation through the at least one physical key and the first and second virtual key sets.

12. The user equipment according to claim 11, wherein the detection unit comprises a G-sensor, and/or a thermal identifying device, and/or a face recognition device configured to detect the current screen direction in real time.

* * * * *